(12) United States Patent
Ukai et al.

(10) Patent No.: US 12,510,373 B2
(45) Date of Patent: Dec. 30, 2025

(54) MAP INFORMATION OUTPUT DEVICE AND METHOD TO OUTPUT AND SELECT CONTROL MAP INFORMATION

(71) Applicants: DENSO CORPORATION, Kariya (JP); TOYOTA JIDOSHA KABUSHIKI KAISHA, Toyota (JP)

(72) Inventors: Hiroki Ukai, Kariya (JP); Takao Kashu, Tokyo (JP); Chika Tsumori, Funabashi (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/657,290

(22) Filed: Mar. 30, 2022

(65) Prior Publication Data

US 2022/0316911 A1 Oct. 6, 2022

(30) Foreign Application Priority Data

Apr. 2, 2021 (JP) .................. 2021-063600

(51) Int. Cl.
*G01C 21/00* (2006.01)
*B60W 30/12* (2020.01)
(Continued)

(52) U.S. Cl.
CPC ..... *G01C 21/3815* (2020.08); *G01C 21/3461* (2013.01); *G01C 21/3859* (2020.08);
(Continued)

(58) Field of Classification Search
CPC ............ G01C 21/3815; G01C 21/3859; G01C 21/3461; B60W 2556/40; B60W 60/001; B60W 306/12
See application file for complete search history.

(56) References Cited

U.S. PATENT DOCUMENTS

| 5,359,529 A * | 10/1994 | Snider | G01C 21/30 73/178 R |
| 8,301,343 B2 * | 10/2012 | Tanimoto | B60W 30/12 180/271 |

(Continued)

FOREIGN PATENT DOCUMENTS

| JP | H08-201090 A | 8/1996 |
| JP | 4019865 B2 | 12/2007 |

(Continued)

*Primary Examiner* — Scott A Browne
*Assistant Examiner* — Terry C Buse
(74) *Attorney, Agent, or Firm* — Maschoff Brennan

(57) ABSTRACT

A map information output device includes: a rule selector sequentially selecting one road selection rule from a plurality of road selection rules based on route guidance information; a target road selector for (i) selecting a target road for constructing control map information based on the road selection rule selected by the rule selector and a position of a vehicle, and (ii) selecting another target road for constructing control map information based on another road selection rule different from the road selection rule selected by the rule selector, respective for automatic drive control; a map information constructor sequentially constructing the control map information; and a map information output unit sequentially outputting the control map information, which determines the control map information to be output based on whether or not the vehicle is traveling on a route to be traveled.

8 Claims, 2 Drawing Sheets

(51) Int. Cl.
   *G01C 21/34* (2006.01)
   *B60W 60/00* (2020.01)
(52) U.S. Cl.
   CPC .......... *B60W 30/12* (2013.01); *B60W 60/001* (2020.02); *B60W 2556/40* (2020.02)

(56) References Cited

U.S. PATENT DOCUMENTS

| | | | |
|---|---|---|---|
| 9,719,795 B2 * | 8/2017 | Kato | G01C 21/367 |
| 2001/0044696 A1 * | 11/2001 | Saitou | B60K 31/0058 |
| | | | 701/93 |
| 2008/0033621 A1 * | 2/2008 | Nakamura | B60W 10/184 |
| | | | 701/65 |
| 2017/0122754 A1 | 5/2017 | Konishi et al. | |
| 2017/0323566 A1 | 11/2017 | Suto | |
| 2018/0149488 A1 | 5/2018 | Suto et al. | |
| 2019/0294167 A1 * | 9/2019 | Kutila | G08G 1/096827 |
| 2020/0198648 A1 * | 6/2020 | Ishioka | G05D 1/0061 |
| 2020/0290619 A1 * | 9/2020 | Mehdi | B60W 60/0011 |
| 2021/0372816 A1 * | 12/2021 | Nishida | G08G 1/0967 |
| 2022/0163341 A1 * | 5/2022 | Maru | G01C 21/3658 |
| 2022/0289228 A1 * | 9/2022 | Yamamoto | B60K 35/80 |
| 2023/0160718 A1 * | 5/2023 | Adachi | G16Y 10/40 |
| | | | 701/450 |

FOREIGN PATENT DOCUMENTS

| | | |
|---|---|---|
| JP | 2019-12130 A | 1/2019 |
| JP | 2019-184761 A | 10/2019 |
| JP | 6620378 B2 | 12/2019 |

\* cited by examiner

MAP INFORMATION OUTPUT DEVICE AND METHOD TO OUTPUT AND SELECT CONTROL MAP INFORMATION

CROSS REFERENCE TO RELATED APPLICATION

The present application is based on and claims the benefit of priority of Japanese Patent Application No. 2021-063600, filed on Apr. 2, 2021, the disclosure of which is incorporated herein by reference.

TECHNICAL FIELD

The present disclosure generally relates to a map information output device and a map information output method for outputting map information to an automatic drive control device.

BACKGROUND ART

A comparative device is known in the art, which stores map information in a storage device, reads map information around the current position from the storage device, and controls the travel of a vehicle using the read map information. That is, in an automatic drive support system, map information representing a road at a lane level is used. Accordingly, vehicle control at the lane level becomes possible.

SUMMARY

It is an object of the present disclosure to provide a map information output device and a map information output method capable of suppressing inconvenience in automatic drive control.

BRIEF DESCRIPTION OF THE DRAWINGS

Objects, features, and advantages of the present disclosure will become more apparent from the following detailed description made with reference to the accompanying drawings, in which.

DETAILED DESCRIPTION (Overall Configuration)

Figure 1:
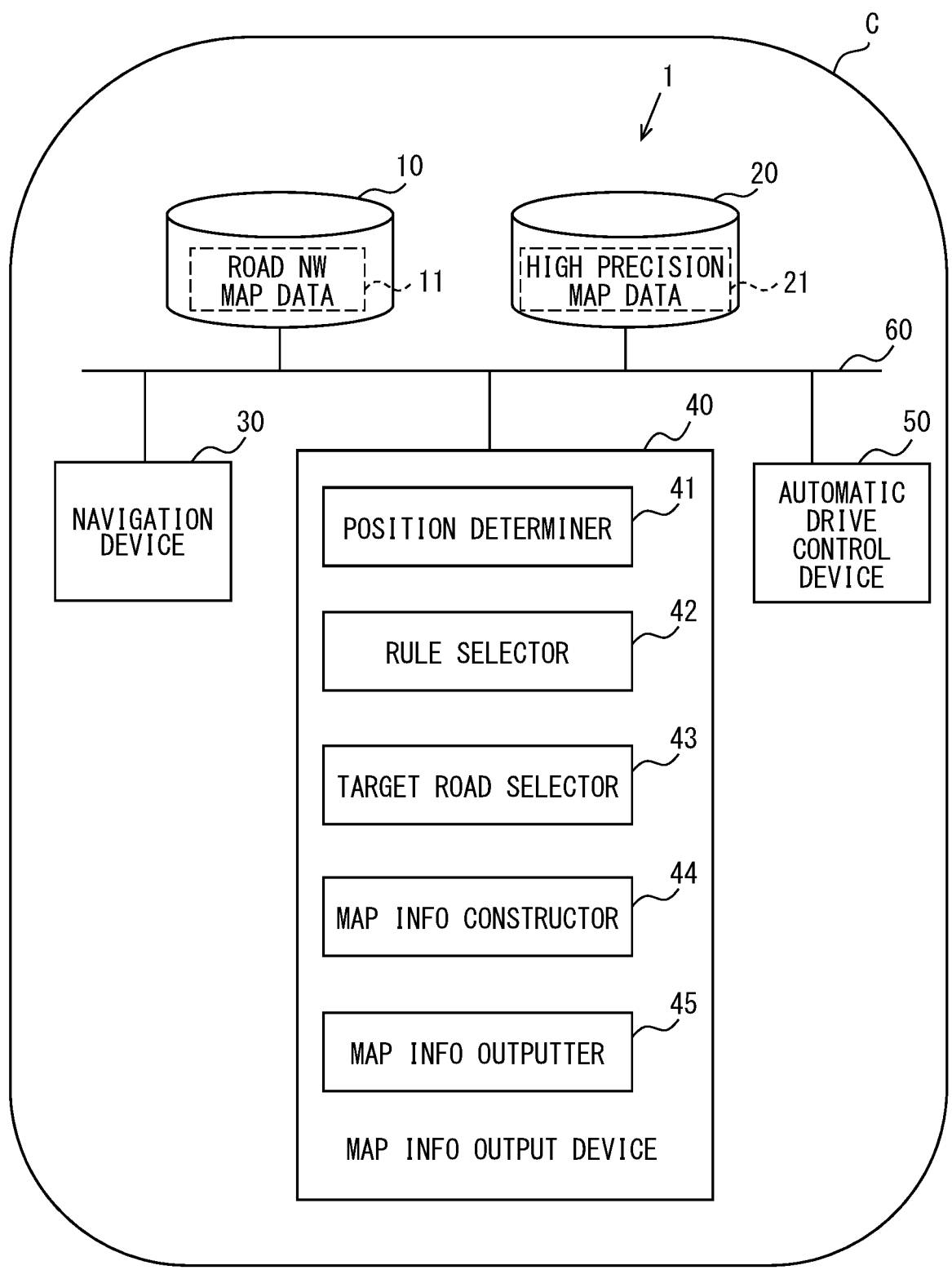
FIG. 1 is a configuration diagram of an automatic driving system.

FIG. 1 is a configuration diagram of an automatic driving system 1 mounted on a vehicle C. The automatic driving system 1 includes a first map storage unit 10, a second map storage unit 20, a navigation device 30, a map information output device 40, and an automatic drive control device 50. These are connected to each other so as to be able to communicate with each other by an in-vehicle LAN 60. The navigation device 30 may include the first map storage unit 10. Further, the map information output device 40 may include the second map storage unit 20. The vehicle C is also provided with an external detection sensor that detects an external environment of the vehicle C, a vehicle state detection sensor that detects a traveling state of the vehicle C, and the like.

The first map storage unit 10 is a non-volatile storage unit. The first map storage unit 10 stores road network map data 11 which is data of a road network map. The road network map is a map in which an actual road is represented by a node, a road link RL, or the like. The node is a point which represents an intersection or the like when a road is represented by a line. The road link RL represents a road section between the nodes. The road link RL represents a road section in units of roads rather than lanes.

The second map storage unit 20 is also a non-volatile storage unit. The second map storage unit 20 stores high-precision map data 21 which is map data having high precision. The road network map represents a road map by using the road link RL, which is a unit of link for each road, while the high-precision maps represents a road map by using a lane link, which is a unit of link for each lane, that is, traffic lanes of the road.

The high-precision map is a map for automatic driving. The automatic driving here is not limited to fully automatic driving. The automatic driving here includes a "lower" level of automatic driving, which may also be called as driving support. The driving support executes one or more controls such as lane keeping control and front vehicle follow-up control (e.g., adaptive cruise control).

The high-precision map data 21 includes topology information and geometry information. Topology information is information that logically models the type of road and the connection form. Topology information includes information that represents lane links. Geometry information is various information for representing an actual road and its surroundings. Geometry information includes road shape, lane marking position, road marking type and position, road sign type and position, traffic light position, and the like.

Figure 2:
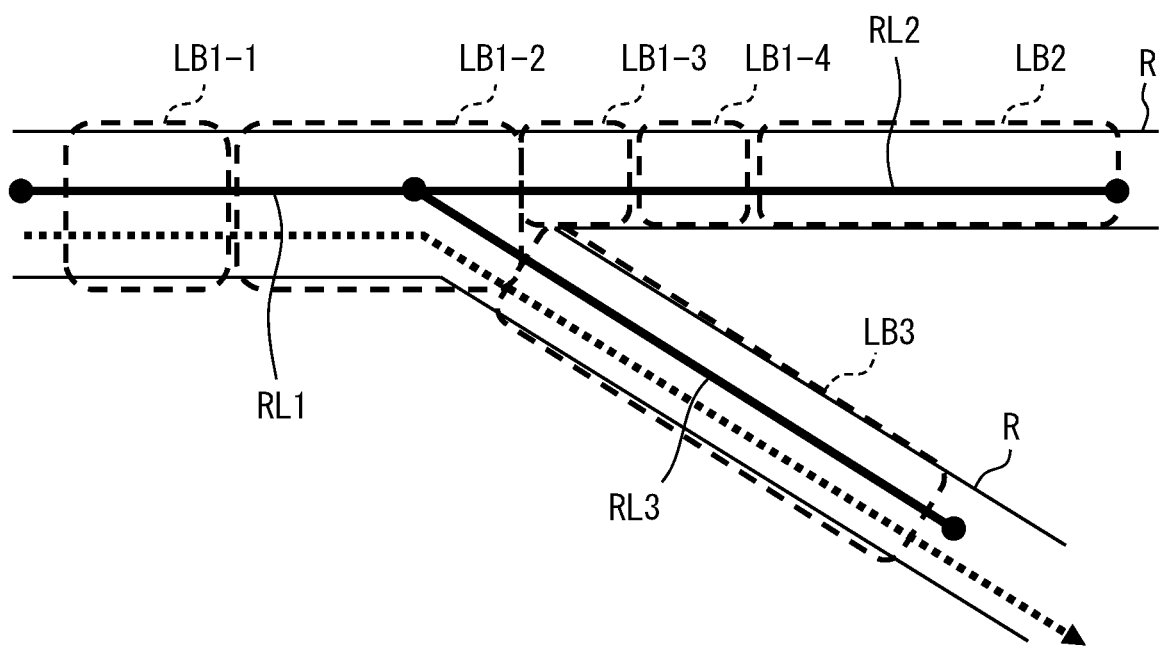
FIG. 2 is a diagram illustrating a high-precision map.

In the high-precision map data 21, the topology information represents a road in units of lane block LB. As shown in FIG. 2, a lane block LB represents a road R divided in the longitudinal direction, i.e., into multiple "lanes." FIG. 2 also shows the road link RL. In the high-precision map data 21, the lane block LB is always associated with one road link RL. The high-precision map data 21 includes information indicating the road link RL from the lane block LB (i.e., an LB pointing to an RL). Since there is a difference in accuracy between the high-precision map data 21 and the road network map data 11, a distance difference may occur at each start point. For example, a situation in which a 120 m lane block LB is associated with a 100 m road link RL may occur. In FIG. 2, lane blocks LB1-1, LB1-2, LB1-3, and LB1-4 are associated with a road link RL1. A lane block LB2 is associated with a road link RL2. A lane block LB3 is associated with a road link RL3.

That is, in other words, an actual position of a lane indicated by a lane block LB may differ from a road link RL to which the lane block LB is associated due to various circumstances such as convenience when setting a guidance route.

For example, an actual lane position indicated by the lane blocks LB1-3 and LB1-4 is a position of the road link RL2. However, the lane blocks LB1-3 and LB1-4 are associated with the road link RL1.

The navigation device 30 sets a guidance route for guiding the vehicle C. When the guidance route is set, the navigation device 30 outputs the guidance route to the map information output device 40. The navigation device 30 sets a guidance route based on the road network map data 11.

The map information output device 40 sequentially constructs control map information, and sequentially outputs the control map information to the automatic drive control device 50. The control map information is information used by the automatic drive control device 50 for automatic drive control. The map information output device 40 constructs the control map information based on the high-precision map data 21. The high-precision map data 21 includes data representing an actual road and an area around the road. The control map information constructed from the high-precision map data 21 also represents the actual road and the area around the road. The control map information can also be called spatial information. A cycle for outputting the control map information by the map information output device 40 can be appropriately set. The cycle may be, for example, 2 seconds. The detailed configuration of the map information output device 40 will be described later.

The automatic drive control device 50, which is also known as an automatic drive controller, determines a future trajectory of the vehicle C based on the control map information. Then, the automatic drive control device 50 controls the behavior of the vehicle C so that the vehicle can travel on the trajectory.

(Detailed Configuration of Map Information Output Device 40)

The map information output device 40 can be realized by a configuration including at least one processor. For example, the map information output device 40 can be realized by a computer including a processor, a non-volatile memory, a RAM, an I/O, and a bus line connecting these configurations. The non-volatile memory stores a map information output program for operating a general-purpose computer as a map information output device 40. The map information output device 40 serves as each of the function blocks shown in FIG. 1 when the processor executes the map information output program stored in the non-volatile memory while using a temporary storage function of the RAM. That is, the map information output device 40 operates as a position determiner 41, a rule selector 42, a target road selector 43, a map information constructor 44, and a map information outputter 45. Execution of these blocks means that a map information output method corresponding to the map information output program is executed.

The position determiner 41 cyclically determines a vehicle position. A vehicle position is a current position of the vehicle C. A cycle for determining the vehicle position is shorter than a cycle for outputting the control map information. The cycle for determining the vehicle position is, for example, 100 ms.

The vehicle position determined by the position determiner 41 has an accuracy so that not only a road on which the vehicle C is traveling can be identified, but also in which lane of a road the vehicle C is traveling can be identified. For example, the position determiner 41 estimates a vehicle position by combined navigation. The combined navigation is a navigation in which a vehicle position is determined by combining a current position obtained from the GNSS receiver and a current position estimated based on a trace of the vehicle C. The position determiner 41 identifies (or calibrates) the vehicle position on a road link RL of the road network map data 11 by map matching using (i) a travel locus estimated by the combined navigation with the current position of the vehicle C as an end point and (ii) the road network map data 11. Further, the position determiner 41 identifies (or calibrates) the vehicle position on a lane link of the high-precision map data 21 by map matching using the travel locus and the high-precision map data 21. The map matching function can determine whether the vehicle C is traveling on the guidance route.

The rule selector 42 selects one road selection rule from a plurality of road selection rules. The road selection rule is a rule used when selecting a target road in the target road selector 43 described below. Based on the road selection rule selected by the rule selector 42, the map information constructor 44 sequentially constructs the control map information, and sequentially outputs the control map information to the automatic drive control device 50. There are three road selection rules in the present embodiment. The first rule is a navigation route rule, which corresponds to a guidance route rule. The second rule is a lane keeping rule. The third rule a no-main-route rule. The rule selector 42 uses the route guidance information to select any one of the plurality of road selection rules.

The route guidance information is information indicating whether or not a route guidance is in progress. When the navigation device 30 sets a guidance route, the guidance route can be obtained from the navigation device 30.

An example of a selection condition for the rule selector 42 to select one road selection rule from a plurality of road selection rules will be described. When a guidance route has been obtained, the rule selector 42 selects the navigation route rule as the road selection rule. The rule selector 42 selects the lane keeping rule when a guidance route cannot be obtained and a lane in which the vehicle C is traveling is identified. The lane keeping rule is a rule for selecting a target road by predicting that the vehicle C keeps the current lane and travels, which can also be called a predicted route rule. The rule selector 42 selects the no-main-route rule when the navigation route rule and the lane keeping rule cannot be selected.

The target road selector 43 sequentially selects a target road based on the road selection rule selected by the rule selector 42 and the vehicle position determined by the position determiner 41. The target road means a road on which control map information is constructed. The target road selector 43 also sequentially selects the target road based on the vehicle position, for a road selection rule different from the road selection rule selected by the rule selector 42 (hereinafter, for another road selection rule). That is, the target road selector 43 sequentially selects the target roads based on the vehicle position for all the road selection rules.

The range of roads to be selected differs depending on whether the road selection rule is a navigation route rule, a lane keeping rule, or a no-main-route rule. When the road selection rule is a navigation route rule, the range of roads to be selected is widest. When the road selection rule is a lane keeping rule, the range of roads to select is second widest. When the road selection rule is a no-main-route rule, the range of roads to be selected is narrowest.

The control map information includes topology information and geometry information. The target road may differ between the topology information and the geometry information. Since the geometry information has a larger amount of information than the topology information, the target road for the topology information may have a range farther from the vehicle C (i.e., may have a wider area coverage from the vehicle C) than the target road for the geometry information.

The target roads include main roads (e.g., trunk roads), branch roads, and merging roads. When the target road selector 43 has obtained the guidance route, the guidance route is set as the main road. When the target road selector 43 has not obtained the guidance route, the target road selector 43 uses a road on which the vehicle C is traveling as the main road. A branch road is a road that branches off from the main road. The merging road is a road that merges/joins the main road.

The target road will be explained with specific numerical values. A main road for the topology information in case of using the navigation route rule can be about 10 km forward from the vehicle position and about 100 m to 200 m rearward from the vehicle position. A branch road for the topology information in case of using the navigation route rule can be a road that branches from the main road between 500 m and 1 km forward from the vehicle position. A merging road for the topology information in case of using the navigation route rule can be a road merging with the main road within a distance of 500 m to 1 km forward from the vehicle position.

A main road for the geometry information in case of using the navigation route rule can be about 1 km forward from the vehicle position and about 100 m to 200 m rearward from the vehicle position. A branch roads and merging roads for the geometry information in case of using the navigation route rule can be the same as the topology information. A target road in case of using the navigation route rule is longer than the target road in case of the lane keeping rule described below. The above configuration is to notify a driver of the vehicle C of a route ahead. Since the target road in case of using the navigation route rule is longer than the target road in case of using the lane keeping rule, an amount of information of the control map information corresponding to the navigation route rule is greater than an amount of information of the control map information corresponding to the lane keeping rule. Since the amount of information is large (when using the navigation route rule), it takes more time to construct than the control map information corresponding to the navigation route rule.

A main road for the topology information in case of using the lane keeping rule can be about 5 km forward from the vehicle position and about 100 m to 200 m rearward from the vehicle position. A branch roads and merging roads for the topology information in case of using the lane keeping rule can be the same as the branch roads and the merging roads for the topology information in case of using the navigation route rule. The main road, the branch road, and the merging road for the geometry information in case of using the lane keeping rule can be the same as the main road, the branch road, and the merging road for the geometry information in case of using the navigation route rule.

In the no-main-route rule, both the topology information and the geometry information can set a main road to be about 1 km forward from the vehicle position and about 100 m to 200 m rearward from the vehicle position. A branch road and a merging road for the topology information and geometry information in case of using the no-main route rule can be the same as the branch road and the merging road for the topology information and geometry information in case of using the lane keeping rule, respectively.

The map information constructor 44 obtains the information of the target road selected by the target road selector 43 from the high-precision map data 21 stored in the second map storage unit 20, and sequentially constructs the control map information. The target road selector 43 sequentially selects a target road based on the vehicle position for the three road selection rules. Therefore, the map information constructor 44 sequentially constructs control map information corresponding to the three road selection rules.

The control map information includes lane network information indicating a network of lanes. The control map information includes various topology information and geometry information included in the high-precision map data 21 in addition to the lane network information. In the control map information, the topology information and the geometry information are represented in units of the lane block LB. Further, the control map information includes a route flag. The route flag is also given to each of the lane blocks LB.

The route flag is a flag indicating whether a certain route is a route to be traveled by the vehicle C. In the present embodiment, there are three types of route flags as follows. That is, there are three types of route flags: a guidance route flag, a lane keeping route flag, and an off-route flag. The guidance route flag is a flag indicating that a lane block LB is associated with a guidance route. The lane keeping route flag is a flag indicating that a lane block LB is a lane keeping route. Just as a lane keeping rule can be called a predicted route rule, a lane keeping route flag can also be called a predicted route flag. The off-route flag is a flag indicating that a lane block LB is neither a guidance route nor a lane keeping route.

The route flag is given/assigned by the map information constructor 44. The map information constructor 44 selects and assigns one route flag from a plurality of types of route flags to each of the lane blocks LB of the target road based on preset conditions set in advance. The conditions under which the map information constructor 44 assigns the guidance route flag, the lane keeping route flag, and the off-route flag are illustrated below.

When the guidance route can be obtained from the navigation device 30, the map information constructor 44 adds a route flag based on the guidance route. The map information constructor 44 assigns a guidance route flag to a lane block LB associated with a road link RL that corresponds to a part of a (present) guidance route. The above is a principle condition. However, when a lane block LB corresponds to, i.e., satisfies, an exception condition described later, the map information constructor 44 does not assigns a route flag to such a lane block LB even when it is a lane block LB associated with the road link RL that corresponds to a part of a guidance route.

A guidance route flag may be added to a road that can continue route guidance even when it is not a guidance route itself. For example, a road that branches off from a guidance route and joins the guidance route again (after a deviation) may be given a guidance route flag. When the vehicle C deviates from a guidance route, the guidance route flag may be assigned to a road returning to the guidance route.

When the target road selector 43 selects the predicted route rule, the map information constructor 44 assigns a lane keeping route flag to the main road determined by the lane keeping rule. Further, the map information constructor 44 assigns a lane keeping route flag to a lane block LB extending from the current position of the vehicle C to a nearest branch point when the target road selector 43 selects the no-main-route rule. Regarding the latter, the target road selector 43 has not selected the lane keeping route rule, but some lane block LBs will have the lane keeping route flag assigned thereto.

The map information constructor 44 assigns an off-route flag to the lane block LB that does not satisfy conditions for assigning the guidance route flag and the lane keeping route flag among the target roads selected by the target road selector 43.

(Exceptional Conditions for not Assigning a Guidance Route Flag)

As described above, when a lane block LB corresponds to exception conditions, even when a lane block LB is associated with the road link RL corresponding to a part of the guidance route, such a lane block LB included in the control map information does not have a guidance route flag assigned thereto. One of the exception conditions will be described below.

In FIG. 2, the guidance route is shown by a dotted line. When the guidance route is indicated by a dotted line, the road link RL1 is a road link RL that is a part of a guidance route. Since the lane blocks LB1-3 and LB1-4 are associated with the road link RL1, the guidance route flag is given according to the above-mentioned principle condition. However, the guidance route flag is not given to the lane blocks LB1-3 and LB1-4 according to the exception condition.

One of the exceptional conditions includes the following conditions (1) to (3).

(1) The first condition is that there are a plurality of next lane blocks which are lane blocks LB connected to a reference lane block in the traveling direction of the vehicle C. The reference lane block is a lane block LB that is used as a reference when determining (1) to (3). The map information constructor 44 sequentially determines whether each lane block LB included in the target road corresponds to (1) to (3) as a reference lane block. When the lane block LB1-2 is used as the reference lane block, the first condition is satisfied because there are two next lane blocks, the lane block LB1-3 and the lane block LB3.

(2) The second condition is a condition that one of the next lane blocks corresponds to a road link RL of a road different from the road link RL having the reference lane block, and that the one of the next lane blocks is associated with a road link RL that is a guidance route. In the example of FIG. 2, the lane block LB3 is associated with the road link RL3 of a road different from the road link RL1 having the reference lane block. The road link RL3 is a road link RL on a guidance route. Therefore, in the example of FIG. 2, the lane block LB1-2 also satisfies the second condition. The second condition is a condition that determines whether, at a reference lane block, the guidance route is changed to another road R.

(3) The third condition is a condition that a lane block LB at an end of the road link RL associated with the reference lane block is connected to a lane block LB to which the off-route flag is given.

When the lane block LB1-2 is used as a reference lane block, the road link RL associated with the reference lane block is the road link RL1. The lane block LB at an end of the road link RL1 in the traveling direction of the vehicle C is the lane block LB1-4. The lane blocks LB1-4 are connected to the lane block LB2. Since the lane block LB2 is a lane block LB that is not included in the guidance route, the lane block LB2 is given an off-route flag. Therefore, when the lane block LB1-2 is used as a reference lane block, the third condition is also satisfied.

When all three conditions are satisfied, among the lane block LBs associated with the same road link RL as the reference lane block, the guidance route flag is not assigned to a lane block LB on an end side of the road link RL with respect to the reference lane block. A flag given in place of the guidance route flag is (i) a lane keeping flag when it is a lane keeping route, and (ii) an off-route flag when it is not a lane keeping route. In the example of FIG. 2, the map information constructor 44 assigns the off-route flag to the lane blocks LB1-3 and LB1-4.

The map information outputter 45 sequentially outputs the control map information sequentially constructed by the map information constructor 44 to the automatic drive control device 50. As described above, the map information constructor 44 sequentially constructs control map information corresponding to the three road selection rules. The map information outputter 45 determines which control map information is output from the control map information sequentially constructed by the map information constructor 44, and based on whether the vehicle C is traveling on the route to be traveled. When a guidance route has been obtained, the guidance route is a route to be traveled.

Therefore, the map information outputter 45 outputs the control map information corresponding to the navigation route rule to the automatic drive control device 50 when (i) the guidance route has been obtained, and (ii) the vehicle C is traveling on the guidance route. When (iii) the vehicle C is not traveling on the guidance route and (iv) the lane has been identified, the map information outputter 45 outputs the control map information corresponding to the lane keeping rule to the automatic drive control device 50. That the vehicle C is not traveling on the guidance route includes a case where the guidance route has not been obtained. When the map information outputter 45 does not output the control map information corresponding to the navigation route rule and the control map information corresponding to the lane keeping rule, the map information outputter 45 automatically outputs the control map information corresponding to the no-main route rule to the automatic drive control device 50.

When the vehicle C deviates from a state of traveling on the guidance route while the vehicle C is traveling, the map information outputter 45 switches the output control map information. Note that the map information constructor 44 sequentially constructs control map information for another road selection rule. Therefore, even when it becomes necessary for the control map information to be output to the automatic drive control device 50 to correspond to a different type of road selection rule (from the one used so far), the control map information can be promptly output.

Focusing on before and after the type of control map information to be output is changed, the map information outputter 45 outputs the control map information corresponding to a road rule selected by the rule selector 42 before the control map information to be output is changed. Immediately after the type of the control map information to be output is changed, the map information outputter 45 outputs control map information corresponding to another road selection rule that has already been constructed. That is, the map information outputter 45 switches the control map information to be output to the automatic drive control device 50 from (i) the control map information corresponding to the road rule selected by the rule selector 42 to (ii) the control map information corresponding to another road selection rule.

(Process to Output Control Map Information at a Time of Reroute)

When the vehicle C deviates from the guidance route due to the driver's operation or the like during the route guidance, the navigation device 30 re-searches a guidance route, i.e., performs a re-route. Then, the navigation device 30 outputs the re-searched guidance route to the map information output device 40.

When the map information constructor 44 obtains the re-searched guidance route, the map information constructor 44 discards the already-generated control map information corresponding to the guidance route rule. Then, the map information constructor 44 reconstructs the control map information corresponding to the guidance route rule based on the re-searched guidance route. Since the control map information has a large amount of information, the time required for the map information constructor 44 to reconstruct the control map information may be longer than the cycle for outputting the control map information.

The target roads for which control map information corresponding to the lane keeping rules is created include branch roads and merging roads in addition to the main roads. Therefore, the control map information corresponding to the lane keeping rule is also created for the road on which the vehicle C is traveling immediately after the vehicle C deviates from the guidance route. Therefore, the map information outputter 45 uses/utilizes the control map information corresponding to the lane keeping rule that has already been constructed while the map information constructor 44 is reconstructing the control map information corresponding to the guidance route rule.

When the control map information for a road link RL that is a part of the guidance route after reconstruction exists, i.e., is included, in the control map information corresponding to the constructed lane keeping rule, the map information outputter 45 uses the control map information that corresponds to the constructed lane keeping rule.

Specifically, the map information outputter 45 assigns a guidance route flag to the control map information for a road link RL, which is the control map information corresponding to the lane keeping rule and is a part of a guidance route, and outputs the control map information to the automatic drive control device 50.

After the map information constructor 44 reconstructs the control map information corresponding to the guidance route rule, the map information outputter 45 outputs the control map information corresponding to the guidance route rule reconstructed by the map information constructor 44 to the automatic drive control device 50.

(Effects of the Embodiment)

The effects of the above-described embodiments will be described below. The map information outputter 45 determines which control map information should be used as the control map information output to the automatic drive control device 50, based on whether or not the vehicle C is traveling on the route to be traveled (i.e., on the guidance route).

The control map information output to the automatic drive control device 50 is one type of the control map information. However, the map information constructor 44 sequentially constructs the control map information corresponding to all types of road selection rules. As a result, the map information outputter 45 can quickly/smoothly output new control map information to the automatic drive control device 50 (e.g., can quickly switch from the old one to the new one), even when the vehicle C deviates from the guidance route while traveling on the guidance route, i.e., in case that the type of the control map information is changed from the one used so far. Therefore, it is possible to prevent an inconvenience from occurring in the automatic drive control performed by the automatic drive control device 50.

A route flag is assigned to each of the lane blocks LB of the control map information. The automatic drive control device 50 that obtains the control map information can determine the road R on which the vehicle C travels based on the route flag.

The map information constructor 44 does not assigns the guidance route flag to a lane block LB even when the lane block LB is associated with the road link RL corresponding to a part of the guidance route, when the exception condition is satisfied. As a result, the map information constructor 44 can suppress the addition of the guidance route flag to the lane block LB, which is not the guidance route, while adopting a principle of assigning a route flag in units of the road link RL.

When the control map information according to the guidance route rule is under reconstruction by the map information constructor 44, the map information outputter 45 assigns a guidance route flag to the control map information regarding the road link(s) RL that is/are a part of the reconstructed guidance route, and outputs the control map information to the automatic drive control device 50. Since a process of assigning the guidance route flag is a process of changing the route flag with respect to the constructed control map information, it is possible to quickly create the control map information to be output to the automatic drive control device 50. Therefore, even when rerouting occurs and it takes time to reconstruct the control map information corresponding to the guidance route rule, a possibility that the route guidance cannot be continued is reducible.

Although an embodiment has been described above, the disclosed technology is not limited to the above-described embodiment, and the following modifications are included in the present disclosure, and various modifications can be made without departing from the spirit of the present disclosure. In the following description, elements having the same reference symbols as those used so far are the same as elements having the same reference symbols in the above embodiment, except when specifically mentioned. When only a part of the configuration is described, the embodiment described above can be applied to other parts of the configuration.

<First Modification>

The navigation device 30 may be configured to distinguish whether the guidance route is a local route or a center route, and may output the guidance route to the map information output device 40. The local route means a guidance route searched by using only the road network map data 11, and the center route is a guidance route searched by using the road map data stored in a center (e.g., a data center) outside the vehicle C. When the guidance route is a local route, the map information output device 40 may be configured not to adopt the guidance route even after obtaining the guidance route. That is, when the guidance route is a local route, the map information output device 40 may select a road selection rule corresponding to the lane keeping rule or a road selection rule corresponding to the no-main-route rule, assuming/pretending that the guidance route has not been obtained.

<Second Modification>

The map information output device 40 and its method described in the present disclosure may be realized by a dedicated computer constituting a processor programmed to perform one or more functions embodied by a computer program. Alternatively, the map information output device 40 and its method described in the present disclosure may be realized by a dedicated hardware logic circuit. Alternatively, the map information output device 40 and its method described in the present disclosure may be realized by one or more dedicated computers configured by a combination of a processor that executes a computer program and one or more hardware logic circuits. The hardware logic circuits may be, for example, ASIC or FPGA.

Further, a storage medium for storing a computer program is not limited to ROM. Alternatively, the computer program may be stored in a computer-readable, non-transitory tangible storage medium as instructions to be executed by a computer. For example, the program may be stored in a flash memory.

What is claimed is:

1. A map information output device comprising:
a map storage unit that stores maps for automatic driving;
a rule selector sequentially selecting a first road selection rule and a second road selection rule based at least partly on route guidance information that has been obtained;
a target road selector for (i) selecting a first target road for constructing first control map information and (ii) selecting a second target road for constructing second control map information, wherein
　(a) the selecting of the first target road is performed based at least partly on the first road selection rule and a position of a vehicle determined by a position determiner,
　(b) the selecting of the second target road is performed based at least partly on the second road selection rule and the position of the vehicle, and
　(c) the first road selection rule is different from the second road selection rule;
a map information constructor sequentially constructing the first and second control map information by obtaining information of the first and second target roads selected by the target road selector from the map storage unit; and
a map information output unit sequentially outputting the first and second control map information sequentially constructed by the map information constructor to an automatic drive controller, wherein
the map information output unit determines a selected control map information to be output to the automatic drive controller based at least partly on whether or not the vehicle is traveling on a route to be traveled, and
in the control map information, a lane of a road is represented by lane links, the lane is divided into a plurality of lane blocks LB in a longitudinal direction of the road, and each of the lane blocks has a route flag assigned thereto, indicating whether each lane block is one to be traveled,
wherein
the map information output unit determines which of the first and second control map information to be output to the automatic drive controller based on the route flag,
the route flag includes a guidance route flag and an off-route flag, the guidance route flag indicates that the lane block is associated with a guidance route, and the off-route flag indicates that the lane block is not the guidance route,
when constructing control map information, a lane block of the guidance route has the guidance route flag assigned thereto, and a lane block satisfying a predetermined condition has the off-route flag assigned thereto, and
the map information output unit outputs to the automatic drive controller, as one of the first and second control map information, the constructed control map information corresponding to a road selection rule that has been selected based on the route flag, wherein
the map information constructor, when one of the lane blocks is set as a reference lane block to be referred to, assigns the off-route flag from the reference lane block to the lane block of a plurality of lane blocks associated with a same road link as the reference lane block, on condition that, even when the lane block has the guidance route set thereon and is associated with the road link that is the guidance route:
　(i) there are a plurality of next lane blocks that are connected to the reference lane block in a traveling direction;
　(ii) one of the next lane blocks is associated with a road link of a road on which the reference lane block is located, and which is a part of the guidance route; and
　(iii) when the lane block at an end of the road link associated with the reference lane block is connected to the lane block to which the off-route flag is assigned, and
when an exception condition is satisfied, the guidance route flag is not assigned to a lane block even when the lane block is associated with the road link corresponding to a part of the guidance route.

2. The map information output device of claim 1, wherein
the road selection rule includes: (i) a guidance route rule which is a rule for selecting a route along a guidance route, and (ii) a lane keeping rule for selecting a lane in which the vehicle is presently traveling,
the route flags include a guidance route flag indicating that the lane block is associated with the guidance route, and an off-route flag indicating that the lane block is not the guidance route, and a lane keeping route flag indicating that the lane block is a lane keeping route,
the map information output unit outputs reconstructed control map information to the automatic drive controller,
by assigning the guidance route flag to lane blocks in the control map information corresponding to the lane keeping rule that has already been constructed, one piece of the control map information about the lane block is a part of the reconstructed control map information,
during traveling, the map information constructor is reconstructing the control map information corresponding to the guidance route rule, and
after the map information constructor reconstructs the control map information corresponding to the guidance route rule, the map information output unit outputs reconstructed control map information to the automatic drive controller.

3. The map information output device of claim 1, wherein
the automatic drive controller controls a behavior of the vehicle so that the vehicle can travel on a trajectory based on the selected control map information.

4. The map information output device of claim 1, wherein
the map information output unit switches between outputting of the first control map information and the second control map information as the selected control map information to be output to the automatic drive controller based on a guidance route of the vehicle relative to the first road selection rule and the second road selection rule.

5. A map information output method comprising:
sequentially selecting one road selection rule from a plurality of road selection rules based on route guidance information that has been obtained;
(i) selecting a first target road for constructing first control map information and (ii) selecting a second target road for constructing a second control map information, wherein the selecting the first and second target roads is performed based on the selected road selection rule and a position of a vehicle determined by a position determiner, and the selecting the second target road performed based on a second road selection rule that is different from a first road selection rule, respective control map information being used for automatic drive control;

sequentially constructing the control map information by obtaining information of the first and second target roads that are selected from a map storage unit; and sequentially outputting the sequentially constructed control map information to an automatic drive controller, wherein the control map information to be output to the automatic drive controller are determined at least partly based on whether or not the vehicle is traveling on a route to be traveled, and in the control map information, a lane of a road is represented by lane links, the lane is divided into a plurality of lane blocks in a longitudinal direction of the road, and each of the lane blocks has a route flag assigned thereto, indicating whether each lane block is one to be traveled, wherein which of the first and second control map information to be output to the automatic drive controller is determined based on the route flag, the route flag includes a guidance route flag and an off-route flag, the guidance route flag indicates that the lane block is associated with a guidance route, and the off-route flag indicates that the lane block is not the guidance route, when constructing control map information, a lane block of the guidance route has the guidance route flag assigned thereto, and a lane block satisfying a predetermined condition has the off-route flag assigned thereto, and the constructed control map information is output to the automatic drive controller as one of the first and second control map information, the constructed control map information corresponding to the road selection rule that has been selected based on the route flag, wherein when one of the lane blocks is set as a reference lane block to be referred to, the off-route flag from the reference lane block is assigned to the lane block of a plurality of lane blocks associated with a same road link as the reference lane block, on condition that, even when the lane block has the guidance route set thereon and is associated with the road link that is the guidance route:

(i) there are a plurality of next lane blocks that are connected to the reference lane block in a traveling direction;

(ii) one of the next lane blocks is associated with a road link of a road on which the reference lane block is located, and which is a part of the guidance route; and (iii) when the lane block at an end of the road link associated with the reference lane block is connected to the lane block to which the off-route flag is assigned, and when an exception condition is satisfied, the guidance route flag is not assigned to a lane block even when the lane block is associated with the road link corresponding to a part of the guidance route.

6. The map information output method of claim 5, wherein outputting of the first control map information and the second control map information is switched as the selected control map information to be output to the automatic drive controller based on a guidance route of the vehicle relative to the first road selection rule and the second road selection rule.

7. A map information output device comprising:

a processor;

a non-transitory computer-readable storage medium; and a set of computer-executable instructions stored on the non-transitory computer-readable storage medium that cause the processor to:

store maps for automatic driving in a map storage unit;

sequentially select a first road selection rule and a second road selection rule based at least partly on route guidance information that has been obtained;

selecting (i) a first target road for constructing first control map information and (ii) a second target road for constructing second control map information, wherein (a) the selecting of the first target road is performed based at least partly on the first road selection rule and a position of a vehicle determined by a position determiner, (b) the selecting of the second target road is performed based at least partly on the second road selection rule and the position of the vehicle, and (c) the first road selection rule is different from the second road selection rule;

sequentially constructing the first control map information and the second control map information by obtaining information of the first target road and the second target road from the map storage unit; and sequentially outputting, as a selected control map information, the first control map information and the second control map information to an automatic drive controller, wherein a selected control map information to be output to the automatic drive controller is determined based at least partly on whether or not the vehicle is traveling on a route to be traveled, and in the control map information, a lane of a road is represented by lane links, the lane is divided into a plurality of lane blocks in a longitudinal direction of the road, and each of the lane blocks has a route flag assigned thereto, indicating whether each lane block is one to be traveled, wherein the set of computer-executable instructions further cause the processor to determine which of the first and second control map information to be output to the automatic drive controller based on the route flag, the route flag includes a guidance route flag and an off-route flag, the guidance route flag indicates that the lane block is associated with a guidance route, and the off-route flag indicates that the lane block is not the guidance route, when constructing control map information, a lane block of the guidance route has the guidance route flag assigned thereto, and a lane block satisfying a predetermined condition has the off-route flag assigned thereto, and the constructed control map information is output to the automatic drive controller as one of the first and second control map information, the constructed control map information corresponding to the road selection rule that has been selected based on the route flag, wherein when one of the lane blocks is set as a reference lane block to be referred to, the off-route flag from the reference lane block is assigned to the lane block of a plurality of lane blocks associated with a same road link as the reference lane block, on condition that, even when the lane block has the guidance route set thereon and is associated with the road link that is the guidance route:
(i) there are a plurality of next lane blocks that are connected to the reference lane block in a traveling direction;
(ii) one of the next lane blocks is associated with a road link of a road on which the reference lane block is located, and which is a part of the guidance route; and
(iii) when the lane block at an end of the road link associated with the reference lane block is connected to the lane block to which the off-route flag is assigned, and when an exception condition is satisfied, the guidance route flag is not assigned to a lane block even when the lane block is associated with the road link corresponding to a part of the guidance route.

8. The map information output device of claim 7, wherein the set of computer-executable instructions stored on the non-transitory computer-readable storage medium further cause the processor to switch between outputting of the first control map information and the second control map information as the selected control map information to be output to the automatic drive controller based on a guidance route of the vehicle relative to the first road selection rule and the second road selection rule.

* * * * *